US005433905A

United States Patent [19]

Tisch

[11] Patent Number: 5,433,905

[45] Date of Patent: Jul. 18, 1995

[54] PRODUCTION PROCESS AND APPARATUS

[76] Inventor: Thomas Tisch, 317 Bilsen Road, Geebung, Queensland, Australia, 4034

[21] Appl. No.: 317,834

[22] Filed: Oct. 4, 1994

Related U.S. Application Data

[63] Continuation of Ser. No. 885,630, May 18, 1992, abandoned, which is a continuation of Ser. No. 479,362, Feb. 13, 1990, abandoned.

[30] Foreign Application Priority Data

Feb. 14, 1989 [AU] Australia .............................. PJ2728

[51] Int. Cl.[6] .............................................. B29C 43/22

[52] U.S. Cl. ...................................... 264/83; 264/102; 264/109; 264/118; 425/371; 425/405.1

[58] Field of Search ................. 264/83, 101, 102, 109, 264/118, 120; 425/149, 371, 407, 411, 405.1

[56] References Cited

U.S. PATENT DOCUMENTS

| | | | |
|---|---|---|---|
| 4,263,007 | 4/1981 | Battigelli et al. | 425/371 |
| 4,517,147 | 5/1985 | Taylor et al. | 264/83 |
| 4,684,489 | 8/1987 | Walter | 264/101 |
| 4,850,849 | 7/1989 | Hsu | 425/407 |
| 4,923,656 | 5/1990 | Held | 264/70 |
| 4,937,024 | 6/1990 | Hickson | 264/83 |

*Primary Examiner*—Mary Lynn Theisen
*Attorney, Agent, or Firm*—Kane, Dalsimer, Sullivan, Kurucz, Levy, Eisele & Richard

[57] ABSTRACT

A process for the production of particulate board from a matrix of flake or particles mixed with a cementitous material includes the steps of continuously feeding the matrix into a press, applying at least one of steam and gas or gases to the matrix to cure same to form the particulate board, and removing steam and gas or gases therefrom by vacuum assistance. The apparatus includes press and diffusion belts, which guide the matrix through a nip, where it is compressed into particulate board. Upon exiting from the apparatus, the boards so produced are cut into predetermined lengths.

26 Claims, 5 Drawing Sheets

PRODUCTION PROCESS AND APPARATUS

Figure 1:
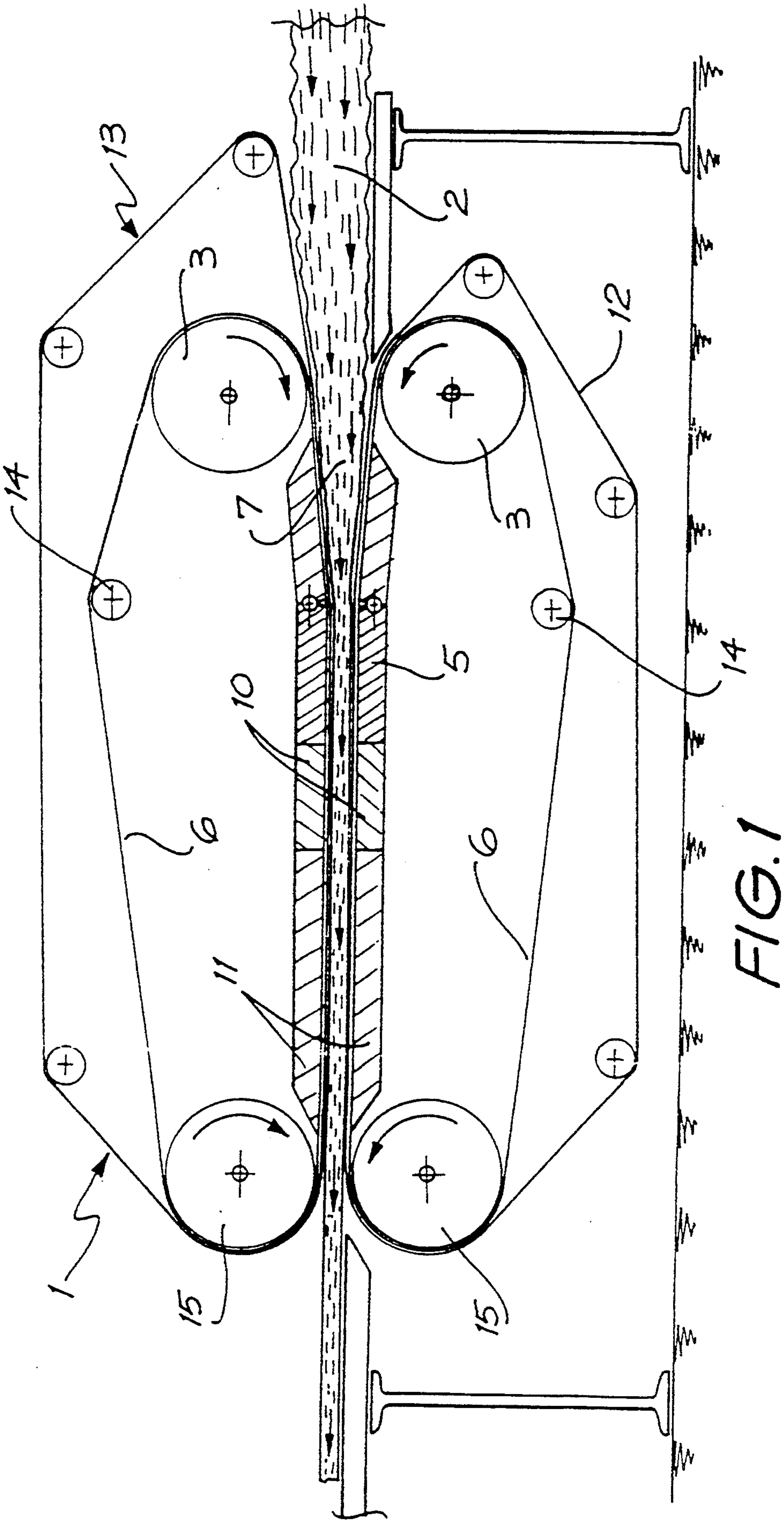

This is a continuation of application(s) Ser. No. 07/885,630 filed on May 18, 1992, abandoned which is a continuation of application(s) Ser. No. 07/479,362 filed on Feb. 13, 1990, abandoned.

This present invention relates to production techniques for products such as particleboard, fibreboard, plywood and to products generally which utilise a matrix of particulate matter in their formation.

More particularly, the invention comprises an improved process and apparatus for producing particulate products in a continuous length utilising steam and/or gases as a medium for heat transfer to heat up the mat to effect curing.

Although the present invention will be described with reference to the production of continuous sheet particleboard this is not to be construed as a limiting application of the apparatus and process of the present invention.

There are in existence at least three conventional processes for the production of particulate sheet material. The manufacture of particleboard from lignocellulose flake furnish is normally carried out by a process involving the stages of flake and/or particle preparation whereby the flakes and/or particle are blended with a cementitous material or compound for example, resin, catalyst and paraffin. The overall matrix or flake furnish forms a mattress which is then pressed into a predetermined thickness then cured by use of a hydraulic hot press.

According to one prior art method the flake is formed into aboard or mats of a certain size and then mechanically loaded into a hydraulic hot press with platens (press platen temperature typically 140°–220° C.) where it is pressed for a period of time sufficient to heat up the centre of the board via the hot press platens and to effect curing of the resin in the furnish. The press is opened after an additional period of low hydraulic pressure during which excess steam which is generated from the water contained in the furnish can escape from the board without damaging it. After opening the press, the board is unloaded and a new mattress is loaded. This method is employed in single as well as in multi daylight flat presses.

According to an alternate prior art method the flake furnish is formed as a continuous and endless mattress of a certain width and is fed on a continuous basis into a continuous press where the board is compressed and through a hot belt is heated so that the curing of the resin is effected. This continuous press consists of basically a nip section, a succession of heated compression and pressure zones, venting zones and an outfeed section. The main advantage of this prior art process over the one previously described is that the system works continuously resulting in an endless board which can be cut into any lengths without any end trim or end offcut losses.

A further prior art system disclosed in Australian specification AU-A 57390/86 has been used which is similar to the first described process however, it differs in that the process is not continuous. It still nevertheless has hot press platens for use in preventing steam condensation in the platens. In this system, curing is carried out by controlled steam injection into the furnish through the press platens. The press platens are perforated to allow the passage of the steam through a steam channel system from a steam generation source. The steam system curing has the advantage that even thick boards within the range (50–100 mm) can be heated through the centre which otherwise would not be possible or feasible. This reduces production time dramatically (German Patent Application 2058820) discloses the use of steam in a manner where steam is injected into the mattress only in the nip section where the mat has not yet been compressed to a great extent.

The intent of this steaming is not to cure the mat but to preheat and soften it. Since the mat at this point is still of a relatively loose composition (at a low density) only steam of low pressure and thus low temperature (120° C.) can be employed, otherwise the forces of the steam would tear the mat apart.

Therefore, in the above process, the mat can only be preheated by the steam and has to be further heated to effect curing. This is done by passing the preheated mat further through the heating section similar to the current practise of continuous presses. Despite the improvements which result from the use of steam the primary disadvantage of processing fixed sized boards, namely, off-cut losses, still persists.

One object of the present invention is to provide a process whereby the advantages of the continuous sheet production process are combined with the use of steam or gas injection for the heating and curing of the furnish. According to the apparatus aspect of the invention there is provided a continuous steam injection press which is simpler and shorter than conventional presses but with equivalent or better production capability.

More particularly, the present invention differs from the other systems in that heating of the mat is solely effected by the injection of steam at various pressures into the mat particularly after the final mat thickness has been reached as opposed to preheating the mat only in the infeed nip section. The heating of pressure platens according to the prior art only serves the purpose of preventing steam condensation in the platens and not to facilitate the heating of the mat. Furthermore, the belt glides over the pressure platens instead of rollers on a low friction material. In addition, a vacuum is employed to actively remove steam from the mat rather than to only rely on venting into ambient atmospheric conditions.

In one broad from the present invention comprises a process for the continuous production of particulate board comprising the steps of, a) mixing a matrix of flake or particles with a mixture of either resin, catalyst and paraffin cementitous material to form a furnish,
b) continuously feeding the furnish into an apparatus having means for feeding, conveying and pressing the furnish into a predetermined width and thickness,
c) applying steam and/or gas/es to the furnish to cure said matrix to thereby form a particulate board,
d) actively removing steam from the furnish by vacuum assistance.

In an alternative form the present invention comprises a process for the production of particulate or fibrous board comprising the steps of;

a) mixing a matrix of flake or particles with a mixture of either resin, catalyst and paraffin cementitous material to form a furnish,
b) continuously feeding the furnish into an apparatus having means for feeding, conveying and pressing the furnish into a predetermined width and thickness,
c) applying steam and/or gas/es to cure the furnish, d) venting the steam by allowing it to escape to the atmosphere and applying a vacuum to the board so formed from said furnish, e) severing said board to a predetermined length.

In the broadest form of the method aspect, the present invention comprises:

a process for the continuous manufacture of particulate sheets formed from a matrix of particulate flakes which form a continuous mat or furnish comprising the steps of;

a) mixing a matrix of flake or particulate matter with a cementitous material to form the furnish;

b) continuously feeding the furnish into the apparatus having means for nip feeding, conveying the furnish and pressing the furnish into a predetermined width and thickness, c) injecting steam and/or gas or gases to the furnish to heat, soften and cure the said furnish, d) venting the furnish, e) actively removing steam and/or said gas or gases from the furnish by vacuum assistance.

In one board form of the apparatus aspect the present invention comprises:

an apparatus for the use in the continuous production of particulate sheets formed by a matrix of particulate material which forms a furnish or mat; the apparatus comprising a superstructure having a supporting platform or pedestal, a lower girder supports by said platform or pedestal and an overlying aligned upper girder such that a surface of each girder opposes a surface of the other girder;

connecting means linking the two girders and enabling the girders to be separated or drawn together to release or sandwich particulate material conveyed therebetween, the girders thereby forming a press;

means on each of the girders to enable engagement therewith of rollers about which travel a continuous press belt and continuous diffusion belt in apposition along said surfaces, the apparatus also comprises;

a source of gas or gases and/or steam for controlled injection, heating and curing of the particulate furnish over a preselected area of the furnish or mat; heating, venting and/or vacuuming segments, low friction pressure platens which enable the said press belt to glide thereon whereby steam passes through said platens and into said furnish;

vacuum forming means to actively remove said steam and/or gas/es from said furnish after said controlled injection heating and curing at said vacuum segment.

According to the apparatus aspect, in another board form the invention comprises;

an apparatus for use in the production of continuous steam or gas cured particulate board formed from a furnish, said apparatus comprising;

a nip feeding means for continuous nip feeding of particulate board comprising press belts and drive rollers adapted to receive said preformed furnish and to urge said furnish along and between said press belts via said nip feeding means, means for compressing said furnish, means for introducing steam and/or gas/es into the mattress to heat up and cure said furnish, means for passively or actively removing the steam and/or gas/es from said furnish, and means for cutting the cured furnish to a predetermined length.

In its broadest form the present invention comprises: an apparatus for the use in the continuous production of particulate sheets formed by a matrix of particulate material which forms a furnish or mat, the apparatus comprising a superstructure having a supporting platform on pedestal, a lower girder supported by said platform or pedestal and an overlying aligned upper girder such that a surface of each girder opposes a surface of the other girder;

connecting means linking the two girders and enabling the girders to be separated or drawn together to release or sandwich particulate material conveyed therebetween, the girders thereby forming a press;

means on each of the girders to enable engagement therewith of rollers about which travel a continuous press belt and a continuous diffusion belt in apposition to each other along said surfaces the diffusion belt providing diffusion of concentrated steam gets passing through the press belt, the apparatus also comprising;

a source of gas or gases and/or steam for controlled injection, heating the curing of the particulate furnish over a preselected area of the furnish or mat;

low friction pressure platens which form heating, venting and/or vacuuming segments and which enable the said press belt to glide thereon whereby steam passes through said platens and into said furnish via said belts;

vacuum forming means to actively remove said steam and/or gas/es from said furnish after said controlled injection, heating and curing at said vacuuming segment;

one or both of the diffusion belts advancing the said furnish along and between the girders and allowing even diffusion of steam through said furnish by breaking up steam jets from said platens.

The present invention will now be described in more detail according to a preferred but non limiting embodiment and with reference to the accompanying illustrations wherein:

FIG. 1: shows a schematic side elevational view of a rolling and pressing machine according to the apparatus aspect of the invention.

Figure 2:
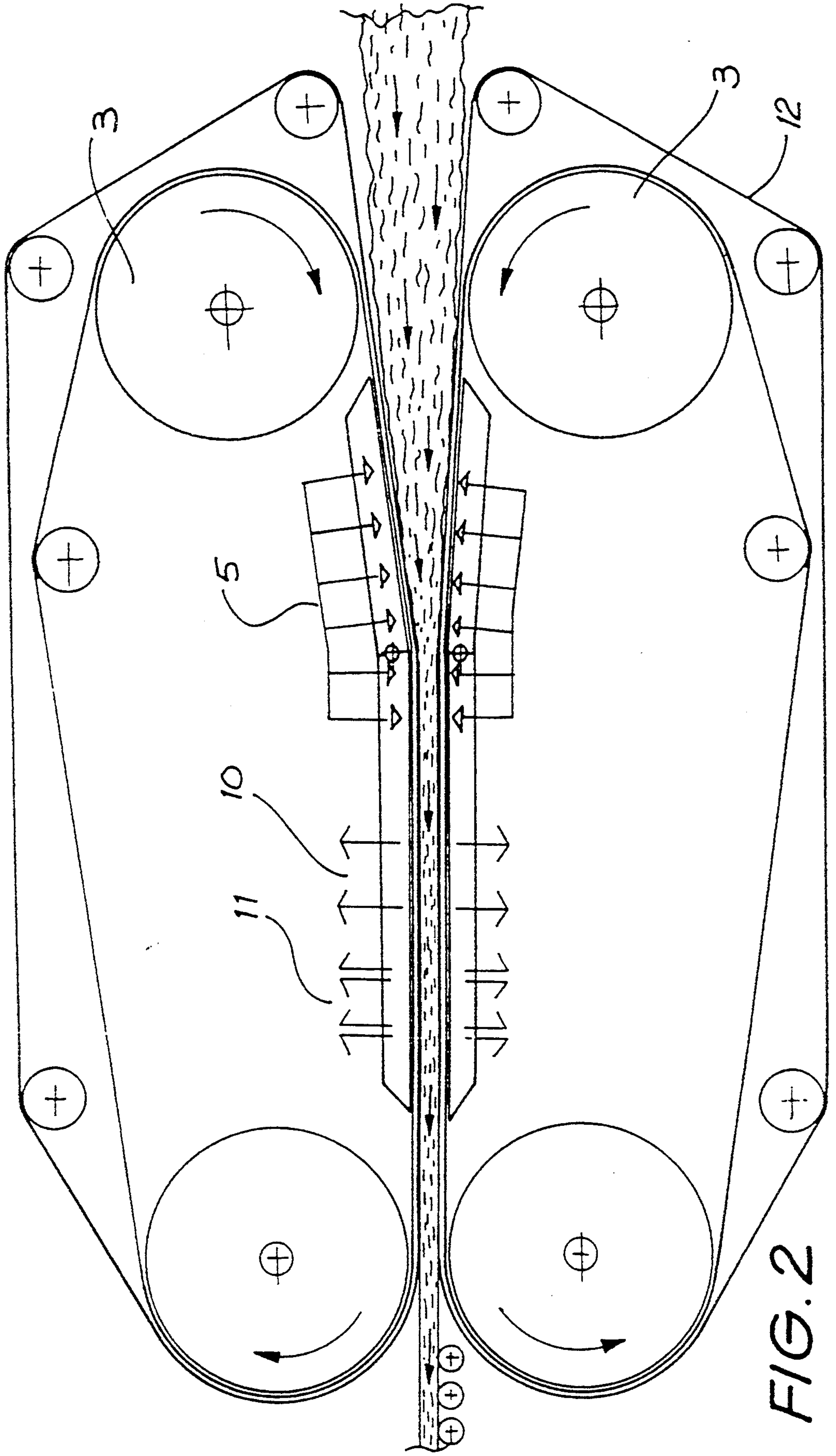

FIG. 2: shows an elevational view of the apparatus of the present invention according to an operational schematic wherein the matrix is being nip fed into the apparatus.

Figure 3:
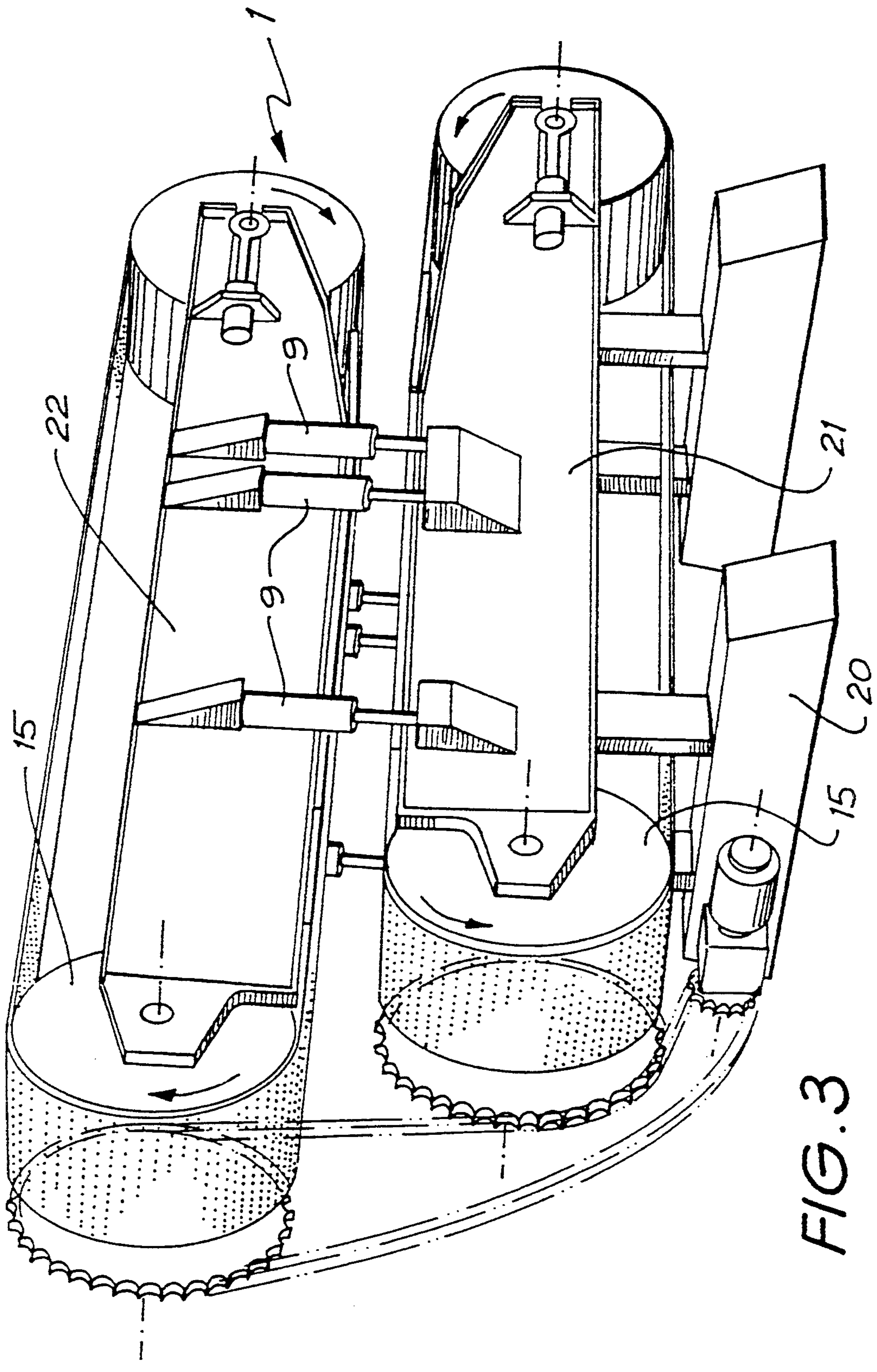

FIG. 3: shows an isometric view of the apparatus according to a preferred embodiment.

Figure 4:
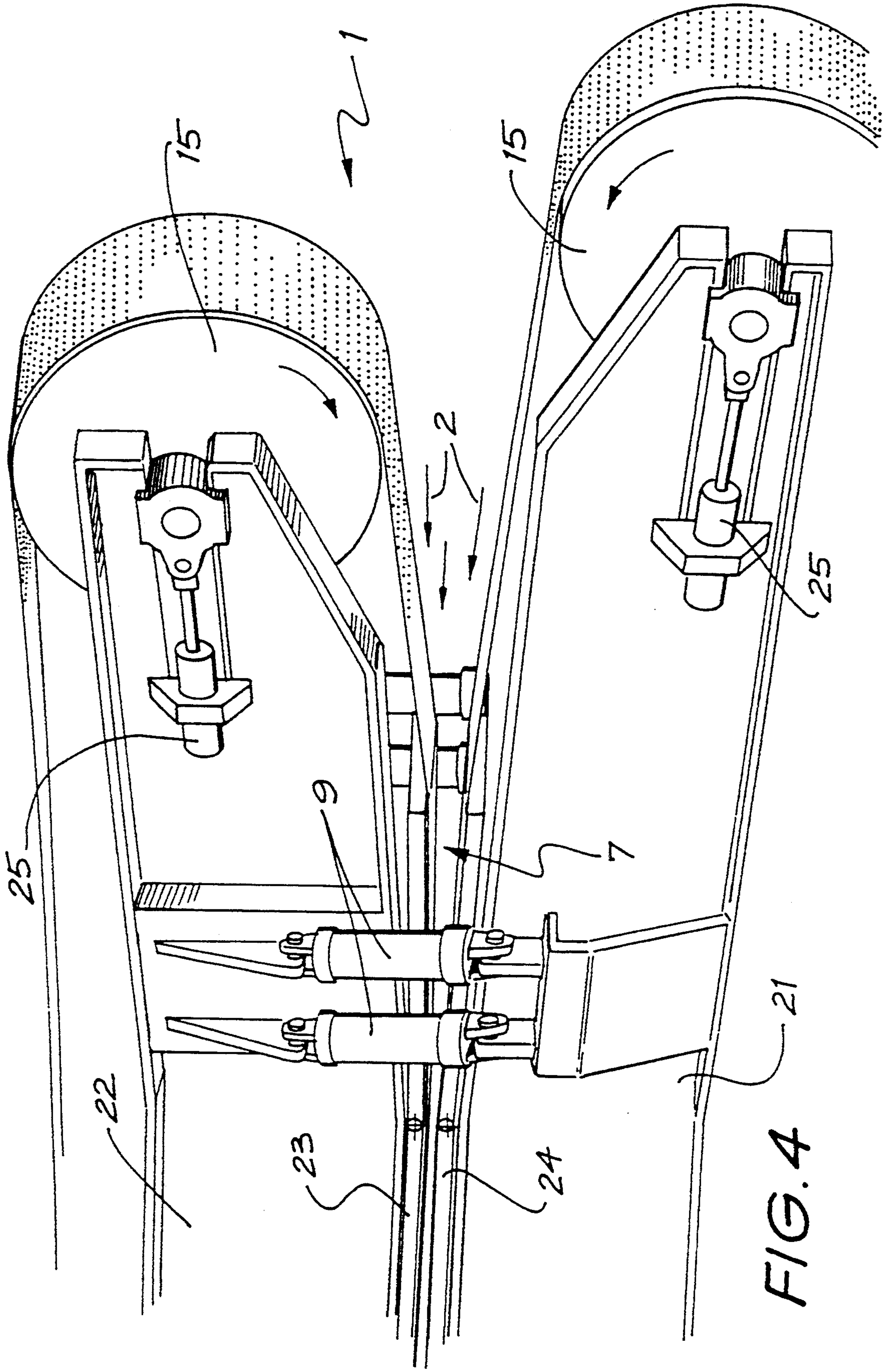

FIG. 4: shows the platens and nip feeding end of the apparatus in more detail.

Figure 5:
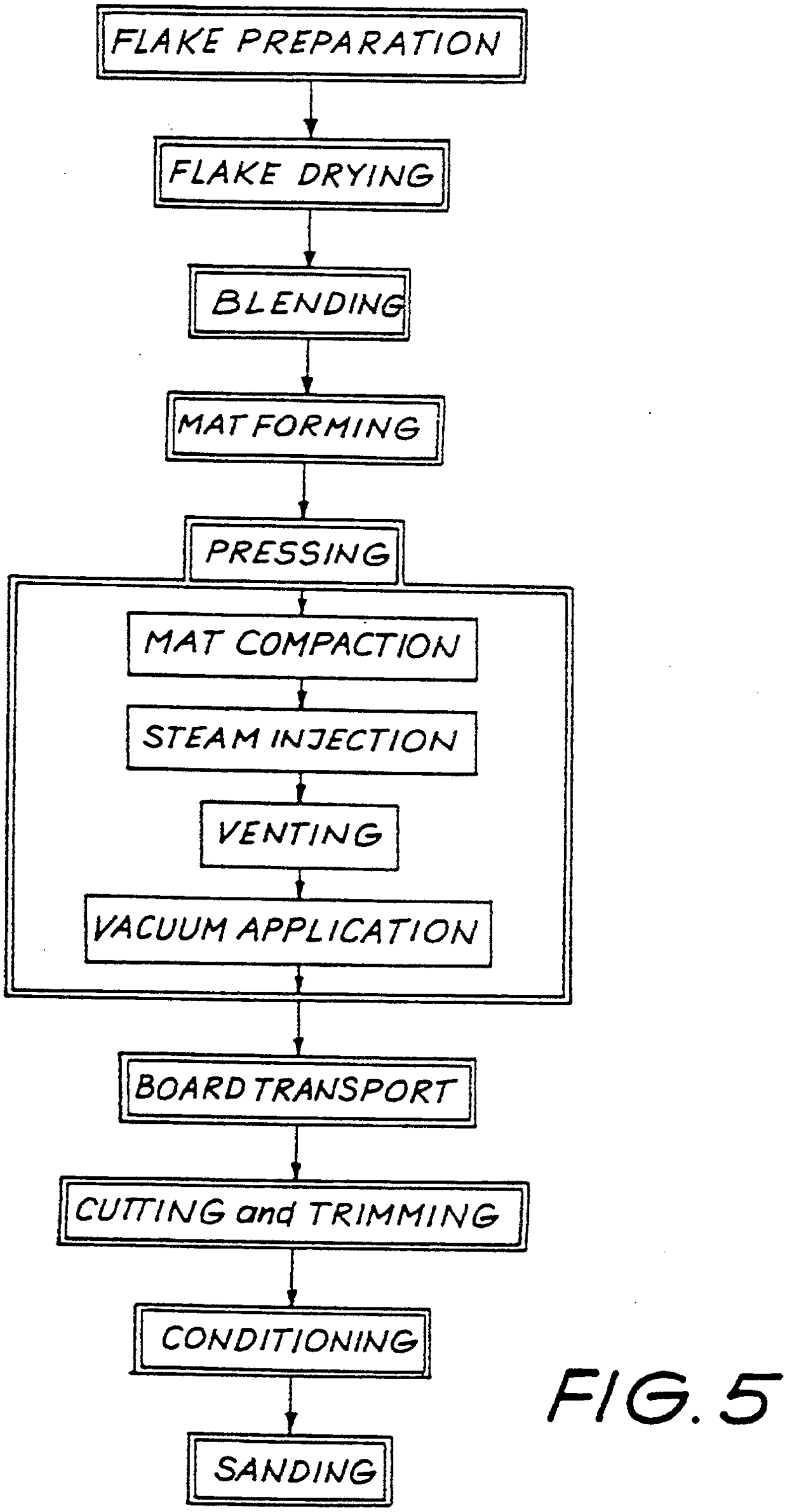

FIG. 5: shows a flow diagram of the various steps in the continuous production process.

Referring to FIG. 1 there is shown a side elevational view of an apparatus 1 for the continuous pressing and curing of a furnish to form a particulate board of a predetermined dimension. The following is a description of the process and apparatus according to a preferred embodiment. Flake furnish which forms mattress 2 is fed into the pressing and curing machine via rollers 3 exiting the machine via drive rollers 15. The flake furnish mattress 2 preferably constitutes a continuous ribbon of lignocellulose particles entering the press as a loose mattress and exiting the apparatus as furnished particleboard.

The flake furnish mattress 2 is formed as an endless mattress and is transported at a constant speed onto the bottom diffusion belt 12. The bottom diffusion belt 12 has primarily two functions. The first is to carry the flake furnish mattress 2 into and through the press and the second is to break up concentrated steam jets coming from the steam injection region 5 through the press belt 6. The diffusion belt diffuses these steam jets (not shown) preventing damaging distortion of the flake furnish mattress 2 passing over each jet. The flake furnish mattress 2 then enters the compression nip 7. Steam is injected into the mattress 2 in the compression nip 7 and is also injected via injection region 5 when the mat is under compression. The total degree of compression as well as the compression rate primarily depends on the desired board characteristics, the nature of the flake furnish mattress 2 and the steam injection pressure employed.

Here, governed by the angle of the nip, the flake furnish mattress 2 is compressed to a desired degree which, amongst other things, is dependent on the nature of the furnish, the mattress feed speed, the desired board characteristics, the pressure and saturation of the injected steam or gas.

The superstructure of apparatus 1 as shown in FIGS. 3 and 4 comprises a supporting platform or pedestal 20, a lower girder 21 and an overlying girder 22. The girder 22 is adapted to apply pressure to the mattress 2 under the assistance of hydraulic cylinders. The pressure is applied to the flake furnish mattress 2 via press belts 6 and platens 23 and 24.

According to a preferred embodiment closing cylinders 9 spaced in selected positions along and bridging the girders, with a predetermined pressure, close the press and thus apply and maintain a certain pressure on the flake furnish mattress 2. Alternatively, the hydraulic pressure can be controlled such that a certain opening distance between the top girder 22 and the bottom girder 21 of the press is maintained.

As the mattress 2 enters the steam injection segment(s) 5 it is subjected to injection of steam at a controlled pressure and of a controlled saturation. This steam as it gets in contact with the colder flake furnish condenses thereby heating up the furnish and at the same time softening the furnish. The heating of the furnish effects the curing of the resin thus bonding the particles together. The softening of the furnish effects a drop in mattress stiffness thus reducing the amount of pressure required to compress the mattress to the desired thickness and thus reducing the friction at the interphase between press belts 6 and the surfaces of the steam injection segment 5. The press belts 6 are endless belts (either manufactured endless or joined or welded together to become endless) with sufficient strength to be pulled through from the nip 7 to vacuum segments 10 and 11. One other major feature of the belts 6 is that they are sufficiently permeable for the steam and/or gas/es to flow from the steam injection ports at nip 7 and steam injection segment 5 through the press belts 6 and the diffusion belt 12 or top steam diffusion belt 13 respectively into the mattress 2 and out again into the venting and vacuum segments 10 and 11.

The apparatus 1 is also adapted with tracking rollers 14 in association with rollers 3 with the former preventing the press belts 6 from running sideways beyond certain limits. The rollers 15 may be adjusted preferably longitudinally along the girders 21 and 22 to increase the tension on the belts 6 and the drive rollers 15 in order to prevent slippage thereabout.

FIG. 4 shows detail of the adjustment cylinder 25 on girder 21 which enables belt tensioning by moving drive rollers 15 on each girder.

The main purpose of the said diffusion belt 13 is the breaking up and diffusion of steam jets as in the case with belt 12.

The steam injection segments 5 consist of the said platens 23 and 24 which are sufficiently strong enough to withstand the pressure employed in the process. The main function of the platens 23 and 24 is to enable steam or gas injection into the mattress 2 evenly across its width. This can be achieved amongst other means by having holes (not shown) in an appropriate pattern drilled into the face of the platens which connect to a steam channel system inside the platens which in turn is fed with steam from a suitable steam supply system. Steam distribution across the segment could also be achieved by the platen material in itself being sufficiently porous and permeable and being appropriately sealed on the surfaces except towards the furnish side.

If more than one steam segment is employed in the system it allows the use of one or a combination of the following; different steam/gas pressures, different degrees of steam saturation and different gases. It can also be envisaged in an alternative embodiment, that in the same segment different gases are injected through separate channel systems.

The steam injection segments can, but don't necessarily have to be heated independently from the steam in order to avoid or reduce condensation of saturation steam in the colder segments. This heating, if employed, could also be used for superheating the injection steam.

The length of the typical steam injection segment 5 has to be sufficient to allow the required quantity of steam being injected into the mattress 2. Apart from the actual design of this section (number, diameter and shape of injection holes and the like) variables influencing this length are primarily steam pressures, mattress feed speed, temperature, furnish characteristics and mass.

Since the steam injected will build up pressure over the whole thickness of the mattress it can be expected that even with only single sided steam injection a steam front over the whole mattress thickness will be generated which will travel towards the infeed side of the press where the furnish is colder and the compression is less thus allowing more steam to condense there as well as letting the steam expand, both of which resulting in a gradual drop of steam pressure from the steam injection section towards the press infeed end.

It needs to be noted that in the currently employed cycle process as described previously, injection from one side only would heat and soften the mattress from one side only resulting in an inbalanced density profile across the board.

As the mattress passes over the venting segment 10, excess steam can escape from the board to the atmosphere and thus the steam pressure which was built up in the injection segments 5 is reduced. The venting segment 10 is similar to segment 5 however, it is not connected to a steam supply but to atmosphere to allow excess steam to escape from the board through the venting platens.

As the board passes over the vacuum segment 11 it is subjected to a vacuum which not only accelerates the removal of steam from the board but also lowers the steam pressure in the board to below atmospheric pressure which as a result of the thus lowered temperature allows free water to evaporate from the board thus reducing the moisture content of the finished board.

Vacuum segments 11 are of similar nature as segments 5 but with the difference that they are connected to a vacuum. The employment of more than one segment enables a more efficacious removal of steam and water from the now compressed mattress or board 2 by using independent vacuum systems. A further optimisation of the vacuum could be achieved by artificially cooling the vacuum platens by means of a suitable cooling medium circulating in the segments.

The lengths of the venting and vacuum segments 10 and 11 respectively are primarily dependent on the characteristics of the board, the feed speed, steam pressure in the board and the desired moisture content.

The distances between the top and bottom of the vacuum segments 5, 10 or 11 can be different or gradually changing at an angle to allow, if so desirable, for further compression, controlled springback or board shrinkage.

The present invention will the use of steam generation overcomes the problems associated with the prior art use of convection heating to cure the resin. Convection heating results in inefficient heat gradients throughout the thickness of the material being processed. In the present invention the steam heats through to the centre of the furnish more quickly and more evenly. As the steam is injected into the furnish it condenses. After the curing, a vacuum may be applied to evacuate excess steam thereby reducing the moisture content. Once the resin is cured there is no longer any need to maintain a curing temperature. The process allows for the continuous production of a greater range of thicknesses of the mattress and hence finished particleboard sheets. The more commonly produced thicknesses fall within the range of 10 to 43 mm, however, these are not to be construed as limiting to the overall range of possible thicknesses.

Other ancillary matters for consideration associated with the process relate to the overcoming of nip friction pressures and feed fraction generally along the apparatus including belt friction.

An example of the process of pressing a particleboard according to the proposed technology is described below:

A continuous mattress of particles prepared according to current state of the art is fed into the apparatus at a constant speed of 5 m/min.

As it enters the nip section which is preferably 1000 mm long and converging at an angle of 4° to a final thickness of 17 mm, the mat is compressed from its initial thickness of say 50 to say 17 mm. For the remaining length of the apparatus until it leaves the apparatus the mat is held at a thickness of 17 mm.

As the mat approaches the end of the nip to within 100 mm and in the following 400 mm of being held at a thickness of 17 mm the mat is subjected to injection of saturated steam of say 4 bar pressure and 143° C. temperature. This steam enters the mat from the platens (which are suitably equipped for this purpose with steam channels) through the perforated steel belt and the diffusion belt.

In order to prevent the steam from condensing in the platens, the platens are heated to above the condensation temperature of the steam.

The steam condenses on the colder particles of the mattress and thus not only heats up the mattress and thus cures the resin but also plasticises the particles resulting in a reduction of the internal mat resistance to compression.

After passing over this area where the steam is injected into the mat it passes over a next section of 400 mm length where the steam still contained in the mat can freely escape through the belts and the platens. The channels of the platens here are connected to atmospheric pressure. In this section due to the escape of the steam the steam pressure in the mat is reduced to say 1–2 bar. Following this section the mat travels over a further section of say 800 mm length where the channels of the platens are connected to a vacuum. Here, not only the remaining amount of steam is withdrawn but due to the reduced vapour pressure in the vacuum environment further water of the previously condensed steam evaporates and is withdrawn from the mat.

After the subjection to this vacuum the mat now being a board leaves the apparatus for further processing according to prior art methods.

Many variations of the above procedure can be imagined notably that the injection and escape/removal of the steam could be through one side only, steam of different pressures could be employed where through separated injection systems steam of lower pressure is injected into the mat in the nip section and steam of higher pressure is injected in the area where the final mat thickness has been reached.

Furthermore, it would be practicable to inject other gases like a curing agent for instance, into the mat either together with or separately from the steam. Separately here could mean that in the same section of the platen there are separate channel systems for the steam and the gases or that there are separate sections (seen in mat travel direction) where the one or the other gas or steam is injected. Besides keeping the different substances apart the latter could be used in a way that different reactions caused by the different gases happen not simultaneously but in succession if so desired. Steam injected in the nip section for instance, would soften and heat the mat and a curing agent injected through the section where the mat is already fully compressed would then effect or accelerate the curing.

The overall process and apparatus as described may be varied in a number of ways. These include alteration to the permeability coefficient of the belt, controlling steam escape to a predetermined route, and pre compression of the mattress before it is fed into the nip.

The process is intended for manual, semi automatic or computer aided operation. It is also envisaged that the system and apparatus is capable of being adapted to existing machines as well as applied to a new apparatus.

It will be obvious to persons skilled in the art that numerous variations and modifications may be made to the present invention as broadly described herein without departing from the overall scope of the invention, as defined in the following claims.

I claim:

1. Apparatus for use in the continuous production of particulate sheets formed by a matrix of particulate material which forms a furnish or mat, the apparatus comprising:

a main frame including an upper frame section and a lower frame section operatively connected so that they can be separated or drawn together;

first and second belt assemblies, the first assembly being operatively connected to the upper frame section and being adapted to travel about rollers, and the second assembly being operatively connected to the lower frame section and being adapted to travel about rollers, a portion of each belt assembly being disposed in spaced relation to a portion of the other so as form a treatment zone therebetween through which the particulate material passes from an infeed end to a discharge end;

each belt assembly comprising a press belt and a separate diffusion belt, said belts being endless loops, one within the other, and, at least in the region of treatment zone, being disposed in intimate contact with one another, with the diffusion belt being adjacent the furnish in the treatment zone and the press belt being disposed on the side of the diffusion belt remote from the furnish;

low fraction pressure platens associated with each belt assembly, said platens being arranged so that each press belt glides over the platens in the treatment zone;

a source of at least one of gas or gases and steam for delivery to a first portion of the pressure platens for controlled injection, heating and curing of the particulate furnish;

vacuum forming means associated with a second portion of the platens downstream of the first portion arranged to actively remove said at least one of steam and gas or gases from said furnish, the diffusion belts causing advance of the furnish through the treatment zone, and causing even distribution of at least one of the steam and gas entering the furnish via the platens.

2. An apparatus according to claim 1 wherein said platens include a venting portion between said first and second portions where at least one of the gas and steam can escape from the furnish.

3. An apparatus according to claim 1 wherein steam or gas is injected into the top and bottom of the furnish at a nip section of said belt assemblies and when the furnish is compressed to its final thickness, the apparatus also having a network of channels associated with, in or on the said platens to facilitate selective injection or removal of gas/es or steam into or from said furnish through said press and diffusion belts.

4. An apparatus according to claim 3 wherein the said platens are divided into segments for receiving or allowing exiting or separate selected gas/es and/or steam.

5. An apparatus according to claim 4 wherein the platens also have associated therewith means to allow preheating thereof to reduce or prevent condensation of steam and to superheat steam to a suitable temperature difference between the incoming steam and the press platens.

6. An apparatus according to claim 5 wherein the said network of channels includes means to enable selective routing or exiting of gases and/or steam through the channels along the width or length of the said platens.

7. An apparatus according to claim 6 wherein at least each of the said press belts are adapted with an array of holes to allow transmission of gas/es and or steam therethrough to facilitate said heating, curing and vacuum assisted removal of steam and/or gas.

8. An apparatus according to claim 7 wherein the said pressure belts are made of steel.

9. An apparatus according to claim 7 wherein the bottom diffusion belt is adapted to convey the particulate mat through said treatment zone and to facilitate via holes the break up of concentrated steam jets emanating from said steam and/or gas source.

10. An apparatus according to claim 9 further including an entry roller and an exit roller about which the diffusion belt and press belt travel, each of said exit rollers being adapted to facilitate tensioning of said belts.

11. An apparatus according to claim 10 wherein the said platens have holes therein which connect to a steam channel network.

12. An apparatus according to claim 10 wherein the furnish is fed to the treatment zone via a nip formed by a plate adapted to e angled so as to enable alteration of the feed angle of the furnish.

13. An apparatus according to claim 12 wherein there is a plate on each frame section one or both of which is adapted to enable adjustment of the nip feed angle.

14. An apparatus according to claim 13 wherein the frame sections have means for measuring the sandwiching pressure exerted on said particulate sheets by platens during travel of sheets through the apparatus.

15. A process for the continuous manufacture of particulate sheets formed from a matrix of particulate flakes which form a continuous mat or furnish, the process comprising the steps of:

(a) providing an apparatus which includes first and second belt assemblies, a portion of each belt assembly being disposed in spaced relation to a portion of the other so as to form a treatment zone therebetween through which the particulate material passes from a nip feed end to a discharge end; each belt assembly comprising press belt and a separate diffusion belt, said belts being endless loops, one within the other, and, at least in the region of the treatment zone, being disposed in intimate contact with one another with the diffusion belt being adjacent the furnish in the treatment zone and the press belt being disposed on the side of the diffusion belt remote from the furnish; low friction pressure platens associated with each belt assembly, said platens being arranged so that each press belt glides over the platens in the treatment zone;

(b) mixing a matrix of flake or particulate matter with a cementitous material to form the furnish;

(c) continuously feeding the furnish into the treatment zone of the apparatus from said nip feed and conveying the furnish and pressing the furnish into a predetermined width and thickness, (d) injecting at least one of steam and gas or gases from said platens at said nip feed end and downstream thereof to the furnish to heat, soften and cure the said furnish, (e) venting the furnish, (f) actively removing said at least one of steam and gas or gases from the furnish by vacuum.

16. A process according to claim 15 wherein the steam is applied by active injection for the purpose of heating and softening and curing the said furnish.

17. A process according to claim 16 comprising the additional step of actively injecting steam and/or a gas or gases into the furnish to cure the furnish whilst under continuous pressure from said apparatus.

18. A process according to claim 17 wherein the active removal of steam and/or gas/es from the furnish takes place when the furnish is under continuous pressure.

19. A process according to claim 18 comprising the further step of artificially cooling venting and vacuum segments in the platens and press belts on said apparatus.

20. A process according to claim 19 wherein the injection of steam and/or gas/es is regulated so as to enable selective application of an withdrawal of the steam from a selected area of the furnish.

21. A process according to claim 20 wherein the injection or vacuum withdrawal of steam and/or gas/es takes place at one or other of the sides of the furnish according to operator selection.

22. A process according to claim 21 wherein the platens are heated to a predetermined temperature to stop unwanted steam condensation on said belt.

23. A process according to claim 22 wherein the platens are preheated to a temperature above the condensing temperature of steam.

24. A process according to claim 23 wherein the particulate furnish is lignocellulose.

25. An apparatus according to claim 14 wherein the particulate furnish is lignocellulose.

26. A process for the continuous production of particulate sheets, the process comprising the steps of:

(a) providing an apparatus including first and second belt assemblies, a portion of each belt assembly being disposed in spaced relation to a portion of the other so as to form a treatment zone therebetween through which the particulate material passes from a nip feed end to a discharge end; each belt assembly comprising a press belt and a separate diffusion belt, said belts being endless loops, one within the other, and, at least in the region of the treatment zone, being disposed in intimate contact with one another with the diffusion belt being adjacent the furnish in the treatment zone and the press belt being disposed on the side of the diffusion belt remote from the furnish; low friction pressure platens associated with each belt assembly, said platens being arranged so that each press belt glides over the platens in the treatment zone;

(b) mixing and compacting particulate material with a cementitous material to form a mat furnish, (c) feeding the furnish into said treatment zone of said apparatus, (d) actively injecting at least one of steam and gas or gases from said platens into the compacted mat furnish at said nip feed end and downstream thereof to heat, soften and cure the furnish, (e) venting the furnish, (f) actively removing from the furnish via a vacuum the said at least one of steam and gas or gases, (g) releasing the furnish from the apparatus and cutting it to a predetermined length.

* * * * *